(12) United States Patent
Hibino et al.

(10) Patent No.: US 7,148,858 B2
(45) Date of Patent: Dec. 12, 2006

(54) PORTABLE RECEIVER

(75) Inventors: Yasuhiro Hibino, Ibi-gun (JP);
Hirokazu Kitamura, Ogaki (JP);
Ryuichi Kamimoto, Nisshin (JP);
Akira Ito, Gifu (JP); Ichiro Koyama,
Gifu (JP); Katsuhiko Yusa, Mizuho
(JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 452 days.

(21) Appl. No.: 10/822,990

(22) Filed: Apr. 13, 2004

(65) Prior Publication Data

US 2004/0207565 A1 Oct. 21, 2004

(30) Foreign Application Priority Data

Apr. 16, 2003 (JP) ............................. 2003-111134

(51) Int. Cl.
*H01Q 1/50* (2006.01)
(52) U.S. Cl. ...................... 343/860; 343/702; 343/850

(58) Field of Classification Search ................ 343/702, 343/860, 862, 713, 850, 852
See application file for complete search history.

(56) References Cited

U.S. PATENT DOCUMENTS 6,816,712 B1 * 11/2004 Otaka et al. .................. 455/83
6,970,140 B1 * 11/2005 Hibino et al. ............... 343/860
7,050,016 B1 * 5/2006 Hibino et al. ............... 343/860

FOREIGN PATENT DOCUMENTS

JP 2002-314450 A 10/2002

* cited by examiner

*Primary Examiner*—Hoanganh Le
(74) *Attorney, Agent, or Firm*—RatnerPrestia (57) ABSTRACT

A portable receiver includes an antenna to which at least FM broadcast wave is inputted, a matching circuit to which the signal input to the antenna is supplied via minute resistance component, an FM receiver unit with the output of the matching circuit connected thereto, and an earphone connected to the output of the FM receiver unit. The antenna is formed from rigid metal, and its length is shorter than the quarter wavelength of the FM broadcast wave. The matching circuit is formed by reactance element having fine DC resistance. The impedance value of the resistance component as viewed via the resistance component from the matching circuit is nearly equal to the impedance of the matching circuit.

19 Claims, 9 Drawing Sheets

FIG. 18

PORTABLE RECEIVER

FIELD OF THE INVENTION

The present invention relates to a portable receiver for receiving at least one of FM broadcast and TV broadcast.

BACKGROUND OF THE INVENTION

Figure 18:
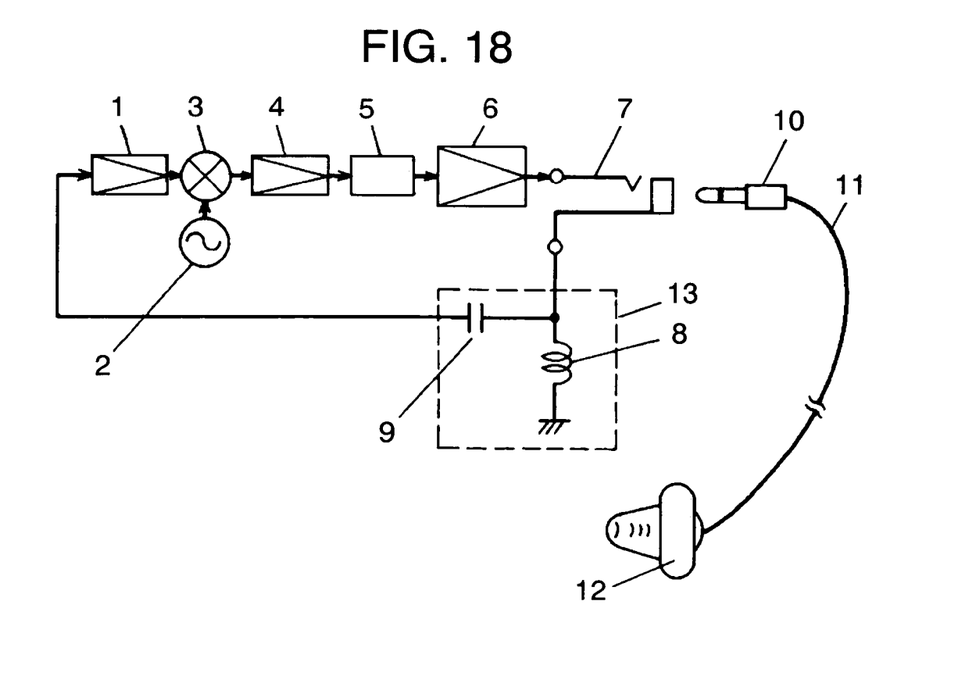
FIG. 18 is a block diagram of a conventional FM portable receiver.

FIG. 18 is a block diagram of a conventional FM portable receiver. The conventional example will be described in the following with reference to the drawings.

A conventional FM portable receiver comprises (a) high frequency amplifier 1, (b) mixer 3 having one input terminal that is connected to the output of high frequency amplifier 1 and having the other input terminal that is connected to the output of local oscillator 2, (c) intermediate frequency amplifier 4 to which the output of mixer 3 is connected, (d) detector 5 to which the output of intermediate frequency amplifier 4 is connected, (e) audio amplifier 6 to which the output of detector 5 is connected, (f) jack 7 to which the output of audio amplifier 6 is connected, (g) inductor 8 connected between the ground side of jack 7 and the ground, (h) capacitor 9 connected between the ground side of jack 7 and the input of high frequency amplifier 1, (i) plug 10 inserted into the jack 7, (j) wire 11 with a length of about 1 m connected to the plug 10, and (k) earphone 12 connected to the wire 11.

The operation will be described in the following. In this FM portable receiver, the earphone 12 as an output means outputs voice. The wire 11 serves as a nearly quarter wavelength antenna for FM broadcast wave. That is, FM broadcast wave is inputted to the wire 11 that serves as an antenna. The input signal is inputted to the high frequency amplifier 1 via high-pass filter 13 comprising the inductor 8 and the capacitor 9. The FM broadcast wave inputted to the high frequency amplifier 1 is mixed by the mixer 3 with the signal from the local oscillator 2 where the frequency is varied, thereby executing channel selection.

The channel-selected signal is amplified by the intermediate frequency amplifier 4 and then detected by the detector 5 to turn into voice signal. The voice signal is amplified by the next audio amplifier 6 and outputted from the earphone 12. The high-pass filter 13 is inserted so that the FM broadcast wave is allowed to pass through but the voice is not. Due to the function of the high-pass filter 13, the wire 11 of the earphone 12 serves a dual function as an transmitter of voice signal and an antenna for FM broadcast wave.

As the documentary information of prior art related to the present invention, for example, Japanese Laid-open Patent 2002-314450 is well-known.

However, in such conventional portable receiver, since the wire 11 of earphone 12 is also used as an antenna for FM broadcast wave, there arises a problem such that the wire 11 dangles and causes unstable reception of FM broadcast wave.

SUMMARY OF THE INVENTION

The present invention is intended to solve the problem, and the object is to provide a portable receiver capable of stable reception.

The portable receiver of the present invention comprises an antenna for receiving broadcast wave; a matching circuit to which the signal received by the antenna is supplied via a resistance component; a receiver unit for demodulating the received broadcast wave, to which the output of the matching circuit is connected; and an output means which outputs the signal demodulated at the receiver unit. The length of the antenna is shorter than the quarter wavelength of broadcast wave, and the impedance of the antenna as viewed via the resistance component from the matching circuit and the input impedance of the matching circuit are substantially equivalent.

DETAILED DESCRIPTION OF THE EXEMPLARY EMBODIMENTS

The preferred embodiment of the present invention will be described in the following with reference to the drawings.

(Preferred Embodiment 1)

Figure 1:
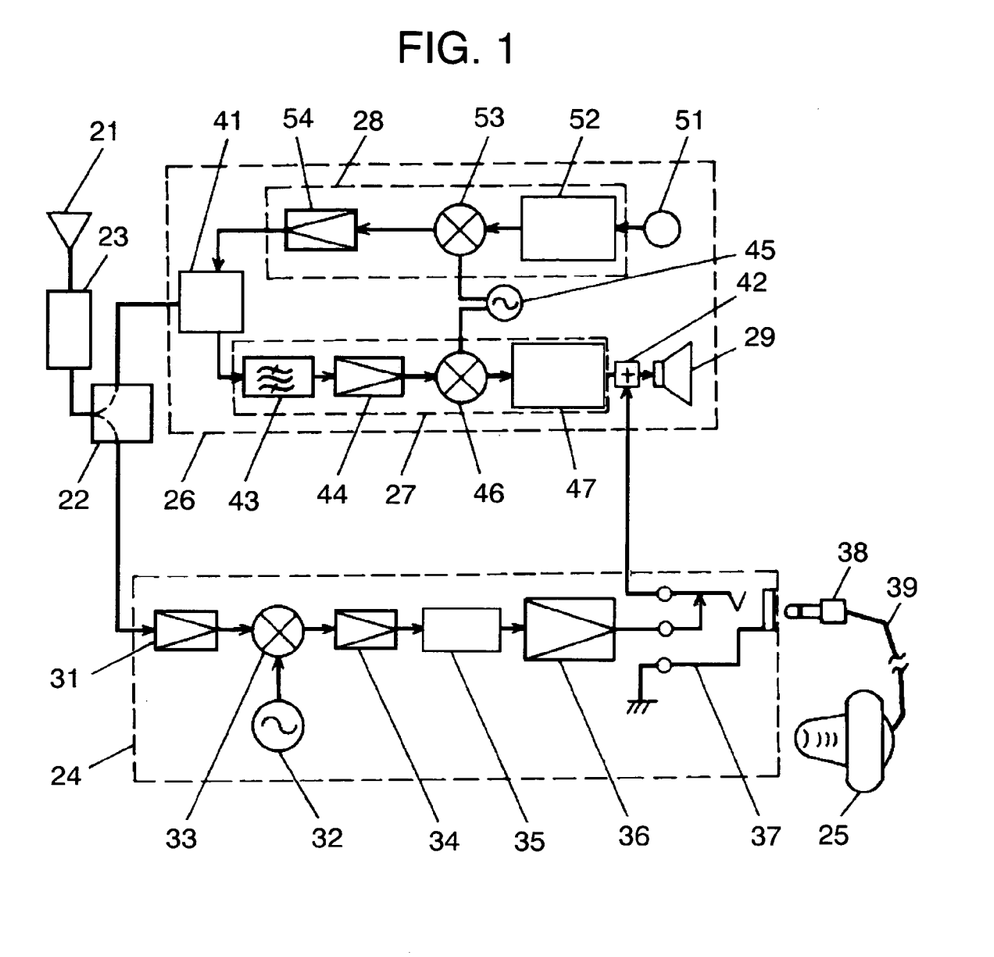
FIG. 1 is a block diagram of a portable receiver in the preferred embodiment 1 of the present invention.

FIG. 1 is a block diagram of a portable receiver in the preferred embodiment 1. The portable receiver in the preferred embodiment 1 comprises an FM receiver for receiving FM broadcast, and a telephone.

Antenna 21 serves to receive FM broadcast waves ranging from 76 MHz to 108 MHz, and to transmit and receive electric waves of a portable telephone, ranging from 810 MHz to 956 MHz and from 1429 MHz to 1801 MHz. The antenna 21 is a mono-pole antenna of 60 mm in length which is designed to nearly quarter wavelength of the portable telephone frequency and is formed from rigid metal. The antenna 21 is connected to branching filter 22 via a matching circuit (described later) 23 formed by reactance element. The output of the matching circuit 23 is outputted to one terminal (hereafter called low-pass terminal) via a low-pass filter (not shown) that allows the FM band of the branching filter 22 to pass through. The low-pass terminal is connected to FM receiver unit 24. The output of the FM receiver unit 24 is connected to earphone 25 as an output means. The matching circuit 23 may be inserted between one terminal of the branching filter 22 and the input of the FM receiver unit 24.

On the other hand, the frequency of the portable telephone inputted to the antenna 21 is inputted to the branching filter 22 via the matching circuit 23 and is outputted to the other terminal (hereafter called high-pass terminal) of the branching filter 22 via a high-pass filter (not shown) that allows the frequency band of portable telephone to pass through. The high-pass terminal of the branching filter 22 is connected to portable telephone unit 26. Accordingly, the portable telephone in the present preferred embodiment serves a dual function as an FM broadcast receiver and a portable telephone.

The FM receiver unit 24 comprises (a) high frequency amplifier 31, (b) mixer 33 having one input terminal that is connected to the output of high frequency amplifier 31 and having the other input terminal that is connected to the output of local oscillator 32, (c) intermediate frequency amplifier 34 to which the output of mixer 33 is connected, (d) detector 35 to which the output of intermediate frequency amplifier 34 is connected, (e) audio amplifier 36 to which the output of detector 35 is connected, (f) jack 37 to which the output of audio amplifier 36 is connected.

The output of the FM receiver unit 24 is connected to earphone 25. That is, through plug 38 inserted into jack 37 and wire 39 with a length of about 1 m connected to the plug 38, the output is connected to the earphone 25.

Here, there exists DC minute resistance (described later) between the antenna 21 and the matching circuit 23. Also, the wiring is shortened for the output of the matching circuit 23 and an active element (not shown) of the high frequency amplifier 31. This is very important for the matching circuit 23 to raise its performance. Specifically, it will improve the matching performance.

The operation of the FM receiver unit 24 is described in the following.

The FM broadcast wave input to the antenna 21 is inputted to the high frequency amplifier 31 via the branching filter 22 and the matching circuit 23. The FM broadcast wave input to the high frequency amplifier 31 is mixed by the mixer 33 with the signal from the local oscillator 32 where the frequency is varied, and thereby, a desired channel is selected.

The channel-selected signal is amplified by the intermediate frequency amplifier 34 and then detected by the detector 35 to turn into voice signal. The voice signal is amplified by the audio amplifier 36 and outputted from the earphone 25. The output of the audio amplifier 36 can also be outputted from the speaker 29 supplied with the output of receiver main body 27 comprising telephone unit 26 described later.

The telephone unit 26 is described in the following. As to the telephone unit 26, the high-pass filter terminal of the branching filter 22 is connected to the common terminal of switch 41 formed by electronic circuits. The switch 41 may be a diplexer. One terminal of the switch 41 is connected to the receiver main body 27, and the output is connected to one input of junction 42. The output of the junction 42 is connected to speaker 29. Also, the other input of the junction 42 is connected to the switch terminal of jack 37.

The receiver main body 27 comprises (a) band-pass filter 43 connected to one terminal of the switch 41, (b) low noise amplifier 44 to which the output of band-pass filter 43 is, (c) mixer 46 having one input terminal that is connected to the output of low noise amplifier 44 and having the other input terminal that is connected to the output of local oscillator 45, and (d) demodulator 47 to which the output of mixer 46 is connected. The output of demodulator 47 is connected to one input of the junction 42. The junction 42 may be formed by resistance, or may use a selector switch formed by electronic circuits.

On the other hand, transmission achieves by using (a) microphone 51, (b) modulator 52 connected to the microphone 51, (c) mixer 53 having one input terminal that is connected to the output of modulator 52 and having the other input terminal that is connected to the output of local oscillator 45, and (d) power amplifier 54 connected between the output of mixer 53 and the other terminal of switch 41. Here, transmitter main body 28 comprises the modulator 52, mixer 53 and power amplifier 54.

The signal receiving operation of the telephone unit 26 will be described in the following.

The electric waves of a portable telephone, received by the antenna 21, are inputted to the switch 41 through the high-pass filter terminal of the branching filter 22. The signal input to the switch 41 is amplified by the low noise amplifier 44 via the band-pass filter 43. The amplified signal is converted by the mixer 46 into a base band and is demodulated by the demodulator 47 into voice signal. And, the voice signal is outputted from the speaker 29 via the junction 42.

Also, in the FM receiver unit 24, the output can be heard from the earphone 25.

Also, as the antenna 21 of the FM receiver unit 24 that receives FM broadcast, an antenna of quarter wavelength of the portable telephone frequency can be used. That is, the antenna 21 can be used for both of FM receiver unit 24 and telephone unit 26. Accordingly, it is possible to reduce the size. Further, stable reception of FM broadcast can be realized because the antenna 21 is small-sized and formed from rigid metal.

Next, the antenna 21 and matching circuit 23, enabling the reduction of antenna size, will be described in detail.

Figure 2:
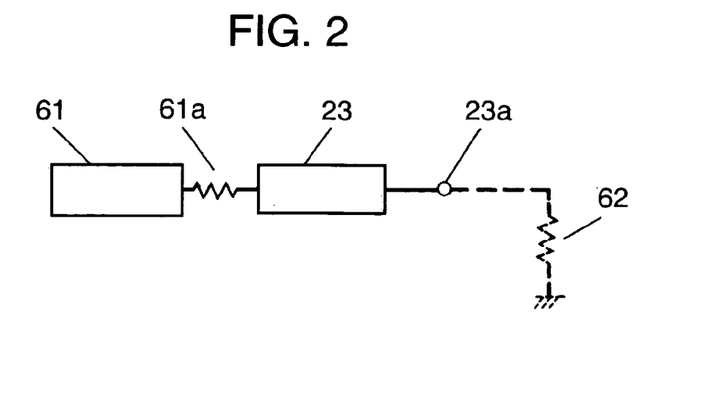
FIG. 2 is a block diagram of an essential portion of the same.

FIG. 2 is a block diagram of an essential portion of the portable receiver of the present invention. The antenna 21 comprises antenna element 61. The antenna element 61 is a 60 mm mono-pole antenna element. Described here is the reception of FM band frequency ranging from 90 MHz to 108 MHz as a representative example. Naturally, the wavelength is 3 m at 100 MHz, and the quarter wavelength is 75 cm. It is here intended to achieve the receiving purpose by using a mono-pole antenna element 61 which is 60 mm in length.

The antenna element 61 is not limited to a mono-pole antenna, but it may use a dipole antenna, sleeve antenna, conical antenna, slot antenna, micro-strip antenna or the like.

As shown in FIG. 2, resistance 61a is connected between the mono-pole antenna element 61 and the matching circuit 23. In this preferred embodiment, the resistance value is 82 ohm. The resistance 61a ranging from 30 ohm to 500 ohm in resistance value brings about excellent results.

The matching circuit 23 is formed by reactance element. The output is connected to output terminal 23a.

Figure 3:
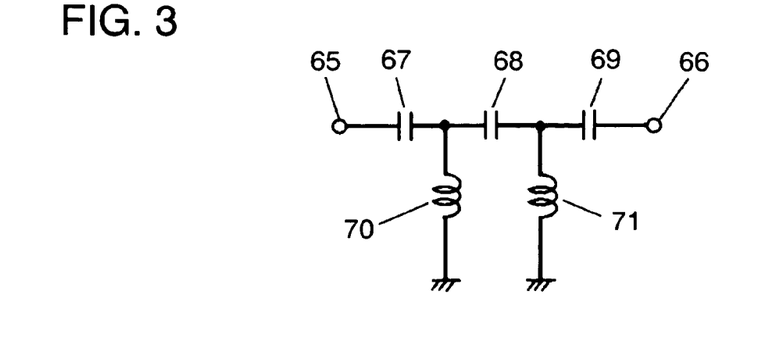
FIG. 3 is a circuit diagram of a matching circuit of the same.

FIG. 3 is a circuit diagram of the matching circuit 23. In FIG. 3, the resistance 61a is connected to terminal 65.

Terminal 66 is connected to the output terminal 23a. Between the terminal 65 and the terminal 66 are series-connected chip capacitor 67 of 33 pico-farad (pF), chip capacitor 68 of 6 pF, and chip capacitor 69 of 12 pF in this order. Chip inductor 70 of 0.47 micro-henry (µH) is connected between the connecting point of capacitors 67, 68 and the ground. Chip inductor 71 of 0.39 µH is connected between the connecting point of capacitors 68, 69 and the ground.

By using such matching circuit 23, it is possible to obtain an antenna whose output impedance is about 75 ohm at received frequency of 90 MHz to 108 MHz.

Figure 4:
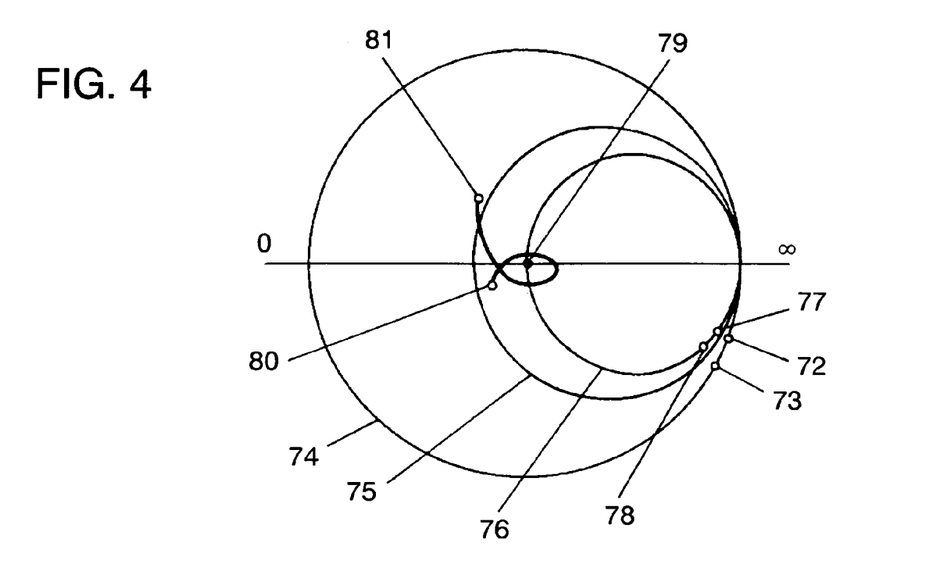
FIG. 4 is s Smith chart of an antenna and matching circuit in FM band receiving mode of the same.

That is, as shown in FIG. 4, impedance value 72 at 90 MHz and impedance value 73 at 108 MHz shift from circle 74 to circle 75 or circle 76 on the Smith chart with resistance 61a inserted. Then, the distance between impedance value 77 at 90 MHz and impedance value 78 at 108 MHz is hardly different from the distance between the impedance value 72 at 90 MHz and the impedance value 73 at 108 MHz. Also, the impedance is adjusted by connecting minute resistance 61a in series fashion to the circle 76 of the Smith chart. In this way, it is possible to easily get closer to the target impedance 79. Moreover, the distance between impedance value 80 at 90 MHz and impedance value 81 at 108 MHz can be shortened as shown in FIG. 4.

In FIG. 2, the load 62 of the matching circuit 23 is 75 ohm. (In this preferred embodiment, the input impedance of high frequency amplifier 31 corresponds to the load 62). Thus, since the impedance of terminal 23a for outputting received waves ranging from 90 MHz to 108 MHz (that is, the output impedance of matching circuit 23 in the configuration shown in FIG. 2) can be set to about 75 ohm, it is possible to supply nearly maximum electric power to the load without occurrence of reflection at the load 62. Also, resistance 61a is then inserted, but the current of antenna element 61 is hardly varied and therefore the level of power will not become lower as compared with an antenna without resistance.

Using a material having resistance of about 82 ohm for the mono-pole antenna element 61, it becomes unnecessary to install the resistance 61a, which may contribute to the size reduction. Also, it may insert a resistor having same resistance value as the resistance 61a in any position between terminal 65 and terminal 66 of the matching circuit 23. In this case, it becomes easier to make the adjustment of reactance at the matching circuit.

Also, it is desirable to use chip parts as parts in the resistance 61a and matching circuit 23, and these chip parts are preferable to be connected by reflow soldering. Chip parts can be accurately installed in predetermined positions as self-alignment effect is generated on the chip parts connected by reflow soldering. Accordingly, it is possible to obtain stable performance without deviation of inductance due to deflected installation of chip parts.

(Preferred Embodiment 2)

Figure 5:
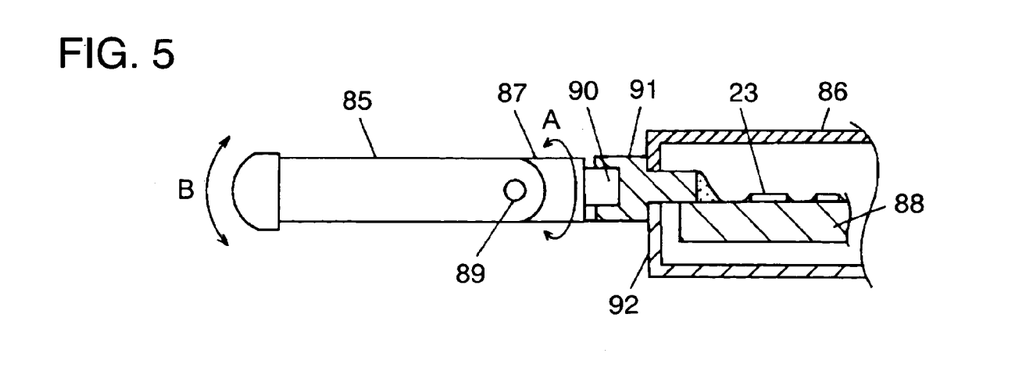
FIG. 5 is a sectional view of an essential portion near an antenna in the preferred embodiment 2 of the present invention.

The preferred embodiment 2 will be described in the following with reference to the drawings. FIG. 5 is a sectional view of an essential portion in the vicinity of an antenna of the portable receiver in the preferred embodiment 2. In FIG. 5, those same as in the preferred embodiment 1 are given same reference numerals, and the description is simplified.

In FIG. 5, antenna body 85 installed at the upper end of portable receiver 86 is connected to printed circuit board 88 in the portable receiver 86 via movable section 87. The antenna body 85, movable section 87, and substrate 91 correspond to the antenna 21 in the preferred embodiment 1.

The movable section 87 is formed from metal so as to enable transmission of received signal, and comprises a first movable section 89 disposed so as to be rotatable in the direction of B shown and a second movable section 90 disposed so as to be rotatable in the direction of A shown. The respective movable sections 89, 90 are disposed in contact with each other. The movable section 90 is rotatably connected to the substrate 91. The substrate 91 is connected to the matching circuit 23 formed on the printed circuit board 88 disposed on the portable receiver 86, and is fixed to the case 92 of the portable receiver 86.

The movable sections 89, 90 and the substrate 91 are electrically connected by contacting each other. The contacting portion of the movable sections makes up predetermined contact resistance. That is, the minute resistance 61a described in the preferred embodiment 1 is formed by the contact resistance.

With the contact resistance value, it is possible to easily set the output impedance to the target impedance by the matching circuit 23 comprising reactance elements and to realize portable receiver 86 of less losses.

Also, the antenna body 85 can be sufficiently shortened in length as compared with the wavelength of the received wave by using the matching circuit 23, and therefore, it is possible to realize the portable receiver 86 reduced in size.

In the preferred embodiment 2, it is preferable to set the contact resistance value at the movable section to a value that can be ignored and to use chip resistance instead. In this case, it is possible to obtain stable resistance value at all times with respect to the directional movement of the antenna body 85. Accordingly, it is possible to realize the portable receiver 86 capable of stable reception irrespective of the direction of the antenna main body 85. When the chip resistance is installed on the printed circuit board 88 the same as the matching circuit 23, the chip resistance can be installed together with the matching circuit 23. That is, it is possible to realize the portable receiver 86 that assures excellent productivity and low cost. When installed on the antenna body 85 side, it becomes easier to obtain the match at the printed circuit board 88 side.

(Preferred Embodiment 3)

Figure 6:
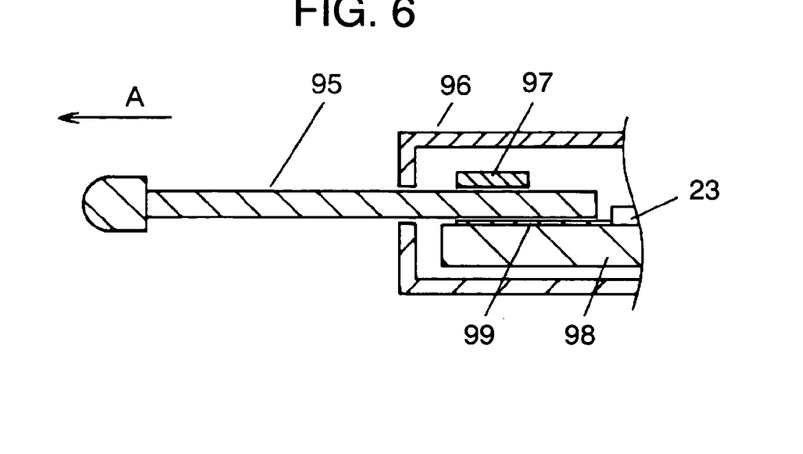
FIG. 6 is a sectional view of an essential portion near an antenna in the preferred embodiment 3 of the present invention.

The preferred embodiment 3 will be described in the following with reference to the drawings. FIG. 6 is a sectional view of an essential portion in the vicinity of an antenna of the portable receiver in the preferred embodiment 3. In FIG. 6, those same as in the preferred embodiment 1 are given same reference numerals, and the description is simplified.

Antenna body 95 installed at the upper end of portable receiver 96 is connected to printed circuit board 98 in the portable receiver 96 via slide section 97. The antenna body 95 and slide section 97 correspond to the antenna 21 in the preferred embodiment 1.

The slide section 97 is formed from metal so as to enable transmission of received signal. The antenna body 95 is disposed stretchable in the direction of A shown. And the slide section 97 is connected to the matching circuit 23 via pattern 99 provided on the printed circuit board 98.

The antenna body 95 and the slide section 97 are electrically connected by contacting each other. It is configured in that the contact resistance generated at the sliding portion between the antenna body 95 and the slide section 97 is the predetermined resistance value. That is, the resistance 61a described in the preferred embodiment 1 is formed by the contact resistance. Accordingly, with the contact resistance value, it is possible to easily set the output impedance to the target impedance by the matching circuit 23 comprising reactance elements and to realize a portable receiver of less losses.

Also, the antenna body 95 can be sufficiently shortened in length as compared with the wavelength of the received wave by using the matching circuit 23, and therefore, it is possible to realize the portable receiver 96 reduced in size.

The contact resistance value is preferable to be a value that can be ignored, and the slide section 97 itself is preferable to have a resistance value to be used as the resistance 61a in the preferred embodiment 1.

Also, it is preferable to use a chip resistor instead of forming slide resistance or resistance at the slide section. In this case, it is possible to obtain stable resistance value at all times with respect to the directional movement of the antenna body 95. It is possible to realize the portable receiver 96 capable of stable reception irrespective of the direction of the antenna body 95. When the chip resistance is installed on the printed circuit board 98 the same as the matching circuit 23, the chip resistance can be installed together with the matching circuit 23, and therefore, it is possible to realize the portable receiver 96 that assures excellent productivity and low cost. When installed on the antenna body 95 side, it becomes easier to obtain the match at the printed circuit board 98 side.

(Preferred Embodiment 4)

Figure 7:
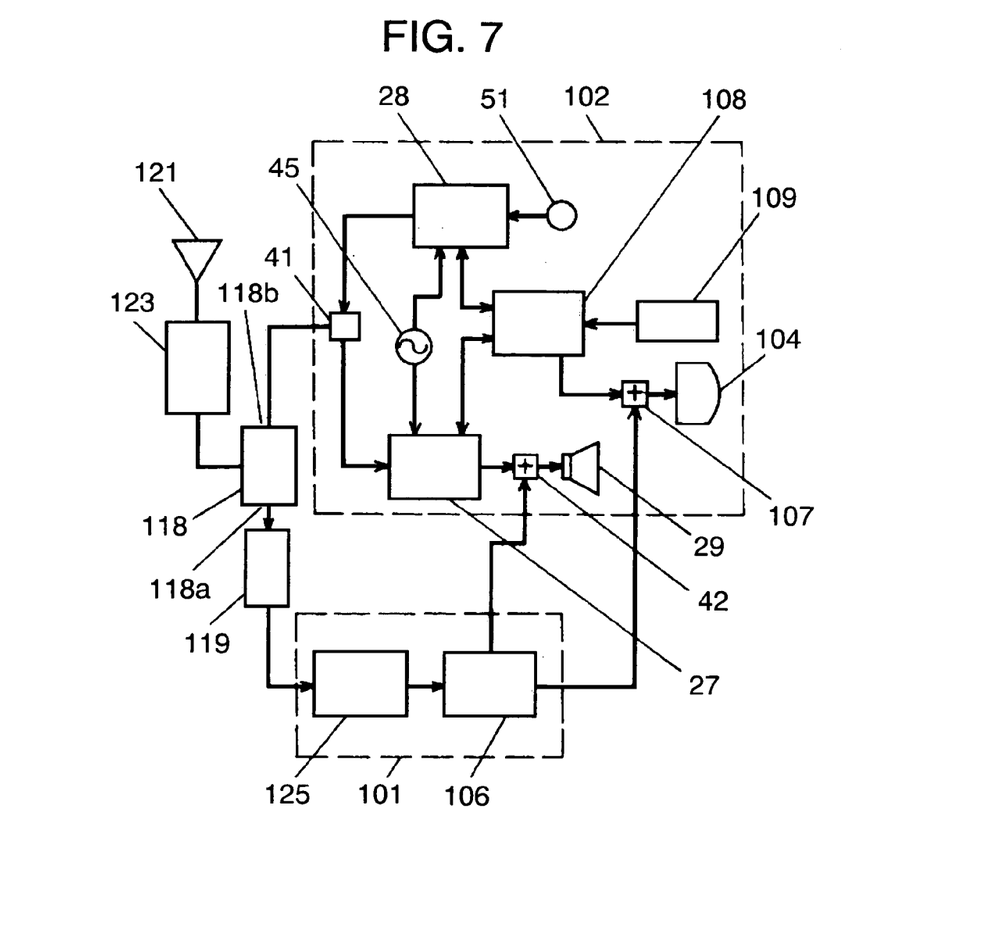
FIG. 7 is a block diagram of a portable receiver in the preferred embodiment 4 of the present invention.

FIG. 7 is a block diagram of a portable receiver in the preferred embodiment 4. The portable receiver in the preferred embodiment 4 comprises TV broadcast receiver and portable telephone 102. Those same as in the preferred embodiment 1 are given same reference numerals, and the description is simplified.

In FIG. 7, antenna 121 serves to receive TV broadcast waves ranging from 90 MHz to 770 MHz, and to transmit and receive electric waves of a portable telephone, ranging from 810 MHz to 956 MHz and from 1429 MHz to 1801 MHz. The antenna 121 is a mono-pole antenna of 60 mm in length which is designed to nearly quarter wavelength of the portable telephone frequency. The antenna 121 is connected to branching filter 118 via a matching circuit (described later) 123 comprising reactance elements. The branching filter 118 outputs TV broadcast waves from one terminal 118a, and inputs and outputs electric waves of a portable telephone from the other terminal 118b. The terminal 118a is connected to TV broadcast receiver unit 101 via amplifier 119. The video output of the receiver unit 101 is connected to liquid crystal display 104 as a video output means of the portable telephone 102. Also, the voice output is connected to the speaker 29 as a voice output means at the portable telephone 102 side.

The receiver unit 101 comprises tuner 125 connected to the output of amplifier 119 and demodulator 106 to which the output of tuner 125 is connected. The voice output of demodulator 106 is connected to the speaker 29 via the junction 42. Also, the video output of demodulator 106 is connected to liquid crystal display 104 via the junction 107.

On the other hand, the electric wave of portable telephone inputted to the antenna 121 is outputted from the other terminal 118b of branching filter 118 via the matching circuit 123. The terminal 118b is connected to the receiver body 27, and the voice output of the portable telephone is connected to the speaker 29 via the junction 42. Here, the matching circuit 123 may be inserted between terminal 118a of the branching filter 118 and the amplifier 119. The video output of portable telephone is connected to liquid crystal display 104 via the junction 107. In the present preferred embodiment, the junction 107 is a selector switch to be electrically switched, but it is also preferable to use a junction which serves for simultaneously displaying the two screens of TV video information and portable telephone information.

The transmitter main body 28 and the receiver main body 27 are connected to controller 108. The output of the controller 108 is connected to the liquid crystal display 104 via the junction 107. Keyboard 109 is connected to the controller 108.

There exists minute resistance R61a between the antenna 121 and the matching circuit 123 the same as in the preferred embodiment 1. Also, the wiring is shortened for the output of the matching circuit 123 and the transistor that is an active element of the amplifier 119. This is very important for the matching circuit 123 to raise its performance (excellent matching).

(Preferred Embodiment 5)

Figure 8:
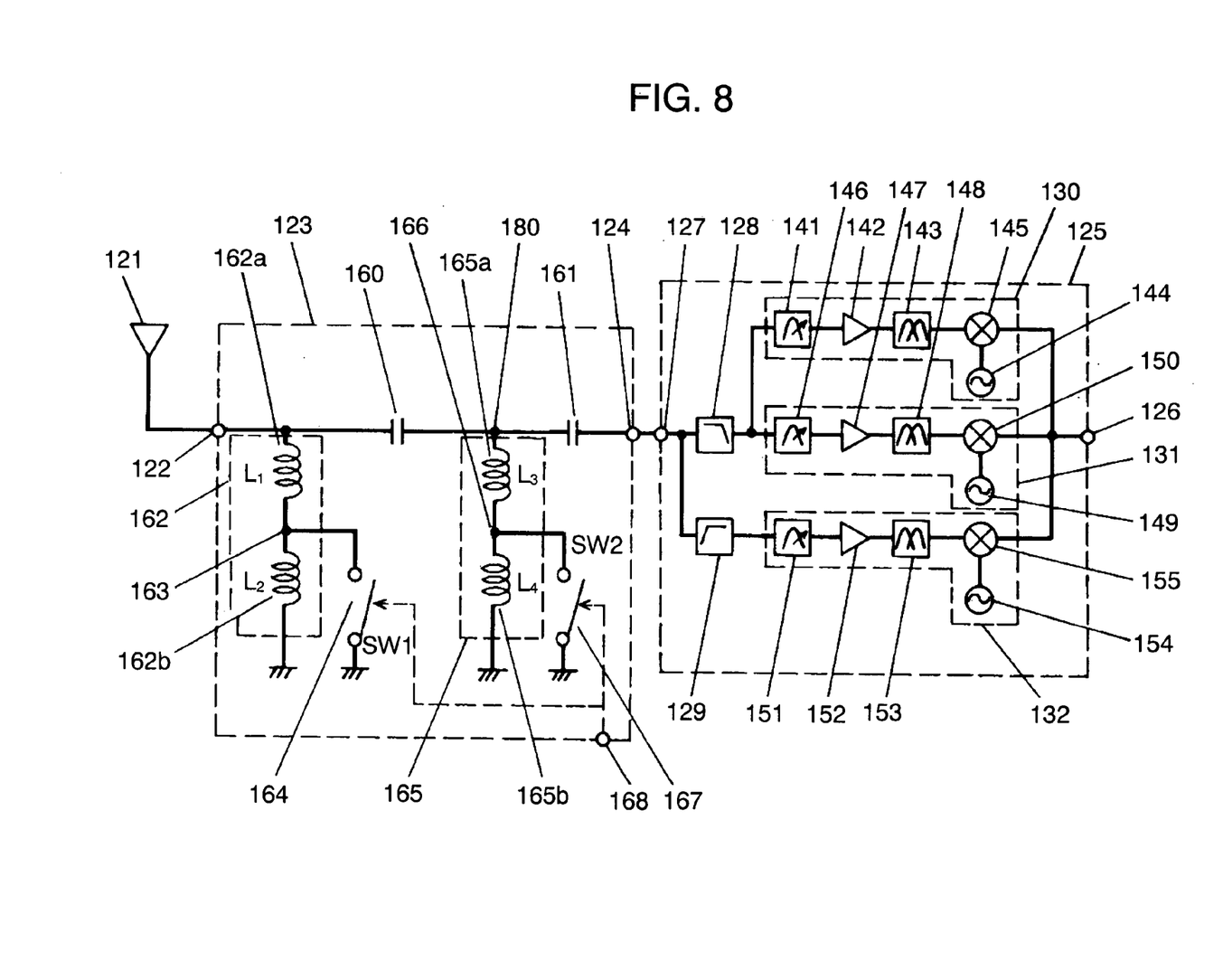
FIG. 8 is a block diagram of a matching circuit and its vicinity in the preferred embodiment 5 of the present invention.

FIG. 8 is a block diagram of a matching circuit of a portable receiver and its vicinity in the preferred embodiment 5 of the present invention. In FIG. 8, the antenna 121 serves to receive TV broadcast waves ranging from about 90 MHz to 770 MHz, and it is a bar-like mono-pole antenna of about 60 mm in length. Since the antenna 121 is formed from brass, its resistance value is small and high frequency loss is small, which therefore assures excellent receiving sensitivity.

The antenna 121 is connected to the input terminal 122 of matching circuit 123. Terminal 124 is the output terminal of the matching circuit 123. In the preferred embodiment 4, the output terminal 124 is connected to the branching filter 118, and terminal 118a of the branching filter 118 is connected the tuner 125 via the amplifier 119. And, only the desired channel is selected by the tuner 125, and the signal is changed to intermediate frequency signal of 58.7 MHz in the case of domestic channel and of 45.75 MHz in the case of U.S. channel, which is then outputted to the tuner output terminal 126. The tuner output terminal 126 is connected to the demodulator 106.

Next, the tuner 125 is described in detail. The tuner 125 serves to receive VHF band and UHF band signals. The tuner input terminal 127 of the tuner 125 is connected to the output terminal 124 of the matching circuit 123. The input terminal 127 is connected to the low-pass filter 128 that removes UHF band signal and to the high-pass filter 129 that removes VHF band signal. The output of low-pass filter 128 is connected to VHF low-band signal receiver 130 and VHF high-band signal receiver 131. On the other hand, the output of high-pass filter 129 is connected to UHF band signal receiver 132. The output of UHF band signal receiver 132, the output of VHF low-band signal receiver 130, and the output of VHF high-band signal receiver 131 are connected to the tuner output terminal 126.

The VHF low-band signal receiver 130 comprises (a) single-tuned filter 141 comprising one tuning circuit, (b) high frequency amplifier 142 to which the output of the single-tuned filter 141 is connected, (c) double-tuned filter 143 comprising two tuning circuits, to which the output of high frequency amplifier 142 is connected, and (d) first mixer 145 having one input terminal that is connected to the output of double-tuned filter 143 and having the other input terminal that is connected to the output of first local oscillator 144.

The VHF high-band signal receiver 131 and the UHF band signal receiver 132 are also configured in the same manner as for the VHF low-band signal receiver 130. That is, the VHF high-band signal receiver 131 comprises single-tuned filter 146, high frequency amplifier 147, double-tuned filter 148, second local oscillator 149 and (e) second mixer 150. Also, the UHF band signal receiver 132 comprises single-tuned filter 151, high frequency amplifier 152, double-tuned filter 153, third local oscillator 154, and third mixer 155.

Next, the matching circuit 123 is described in detail. First capacitor 160 is connected to the input terminal 122 of the matching circuit 123. Second capacitor 161 is inserted between the first capacitor 160 and the output terminal 124. Second inductance 165 is inserted between the connecting point 180 of the first capacitor 160 and the second capacitor 161 and the ground. Also, the first inductance 162 is inserted between the connecting point of the input terminal 122 and the first capacitor 160 and the ground.

The first inductance 162 comprises inductor 162a and inductor 162b, and they are connected in series. The inductor 162a is provided at the input terminal 122 side. First switch 164 formed of electronic circuits is connected in parallel with inductor 162b. The second inductor 165 comprises inductor 165a and inductor 165b, and they are connected in series. The inductor 165a is provided at the first capacitor 160 side. Second switch 167 formed of electronic circuits is connected in parallel with 165b. These first switch 164 (used as an example of switching means) and the second switch 167 (used as an example of switching means) are turned ON/OFF by the signal input to the control terminal 168. That is, the first switch 164 and the second switch 167 are turned ON/OFF in an interlocked fashion.

Figure 9A:
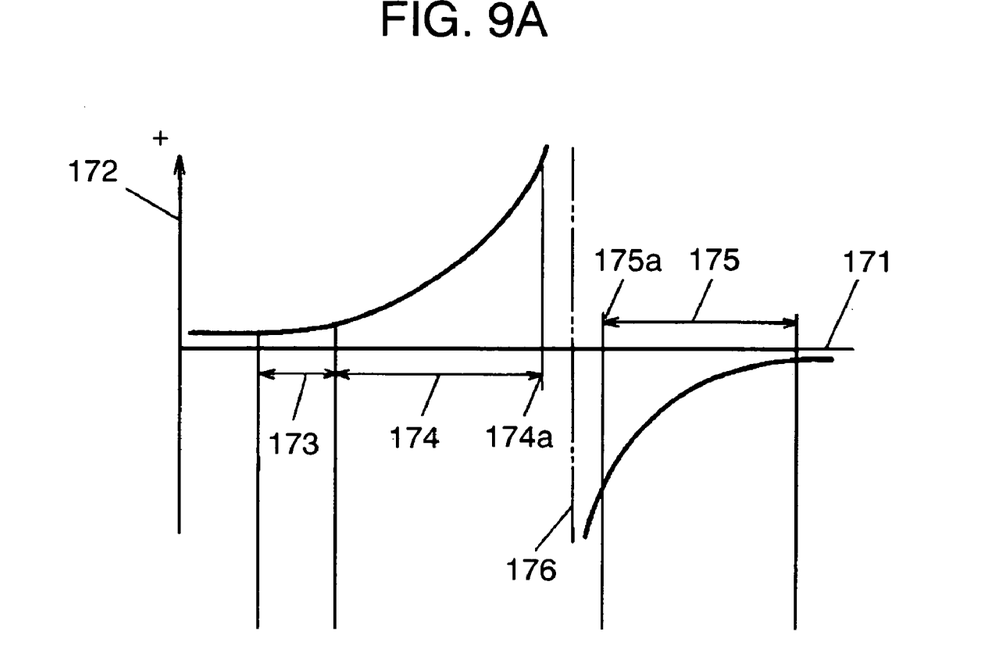
FIG. 9A, B are reactance characteristics charts of the same.

Next, FIG. 9A, B are the conceptual diagrams of reactance characteristics of inductors used in the preferred embodiment. FIG. 9A is the reactance characteristic of inductor 162a or inductor 165a, and FIG. 9B shows the reactance characteristic of inductor 162b or inductor 165b.

In these figures, horizontal axis 171 is frequency, and vertical axis 172 is reactance. And, the plus direction stands for inductance characteristics, and the minus direction stands for capacitance characteristics.

As shown in FIG. 9A, inductor 162a and inductor 165a display inductance characteristics at the frequency band 173 of VHF low-band and the frequency band 174 of VHF high-band, and capacitance characteristics with respect to UHF frequency band 175. That is, inductor 162a and inductor 165a have such characteristics that the self-resonance frequency 176 is between the highest frequency 174a of frequency band 174 of VHF high band (hereafter called the high end of VHF high) and the lowest frequency 175a of frequency band 175 of UHF band (hereafter called the low end of UHF band).

Figure 9B:
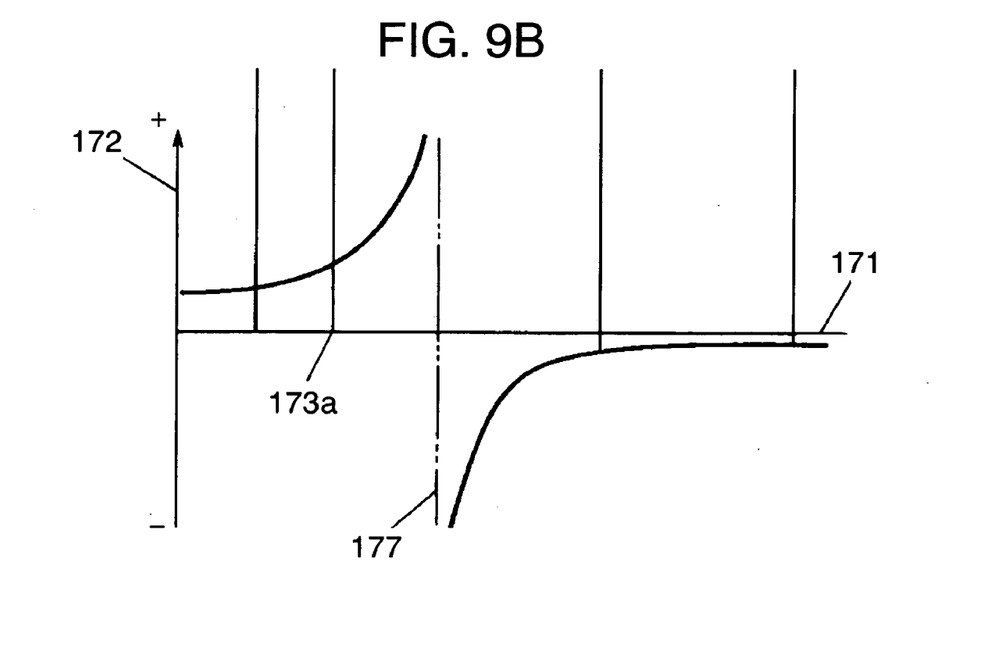

On the other hand, as shown in FIG. 9B, inductor 162b and inductor 165b display inductance characteristics at the frequency band 173 of VHF low-band, and capacitance characteristics at the frequency band 175 of UHF band. And, inductor 162b and inductor 165b have such characteristics that the self-resonance frequency 177 is between the highest frequency 173a of the frequency band 173 of VHF low-band (hereafter called the high end of VHF low) and the low end 175a of UHF band. The relationship between these frequencies and each inductor can be summarized as shown in Table 1. In Table 1, L1 is inductor 162a, L2 is inductor 162b, L3 is inductor 165a, and L4 is inductor 165b.

TABLE 1

| Band Frequency | VHF low-band 90 MHz to 108 MHz | VHF high-band 170 MHz to 222 MHz | UHF 470 MHz to 770 MHz |
| --- | --- | --- | --- |
| L1 | Inductance | Inductance | Capacitance |
| L2 | Inductance | Inductance or Capacitance | Capacitance |
| L3 | Inductance | Inductance | Capacitance |
| L4 | Inductance | Inductance, Capacitance | Capacitance |

Figure 10:
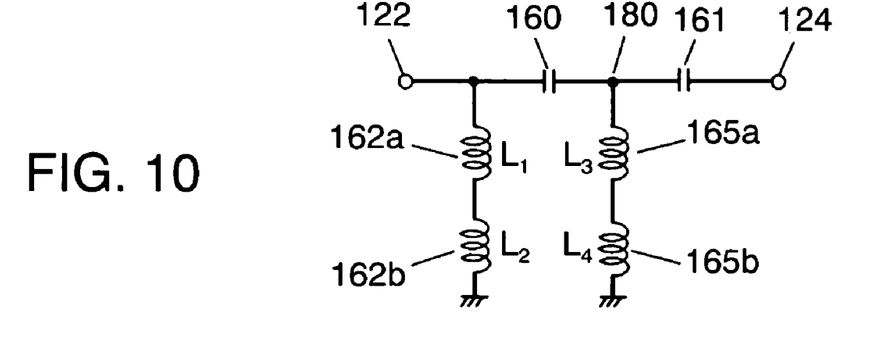
FIG. 10 is an equivalent circuit diagram in VHF low-band receiving mode of the same.
Figure 11:
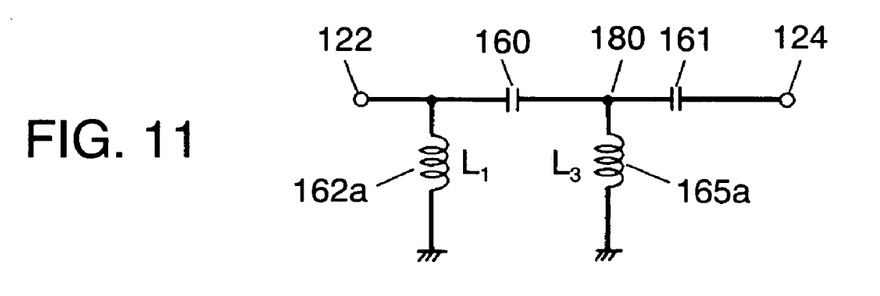
FIG. 11 is an equivalent circuit diagram in VHF high-band receiving mode of the same.
Figure 12:
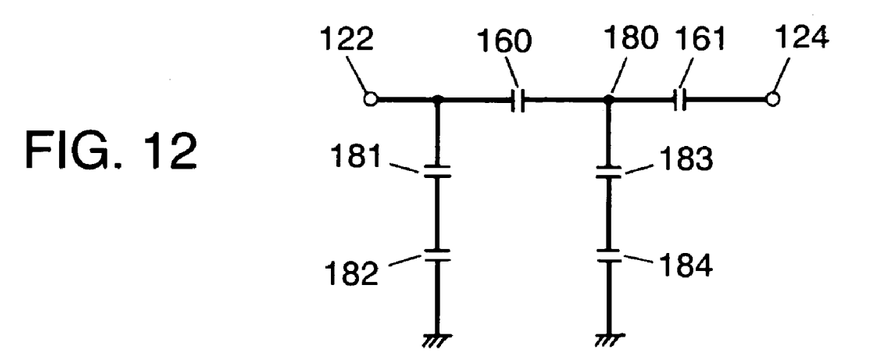
FIG. 12 is an equivalent circuit diagram in UHF receiving mode with switch turned OFF of the same.

The operation in receiving mode of matching circuit 123 in the preferred embodiment having the above configuration will be described in the following. FIG. 10 to FIG. 12 show equivalent circuit diagrams of the matching circuit 123. FIG. 10 is the circuit in receiving VHF low-band signal, and FIG. 11 is the circuit in receiving VHF high-band signal, and FIG. 12 is the circuit in receiving UHF band signal.

And, the matching circuit 123 in the preferred embodiment 5, as shown in Table 2, when receiving VHF low-band, both the first switch 164 (SW1) and the second switch 167 (SW2) are turned OFF, and when receiving VHF high-band, both the first switch 164 (SW1) and the second switch 167 (SW2) are turned ON. When receiving UHF band signal, the first switch 164 (SW1) and the second switch 167 (SW2) are turned either ON or OFF.

TABLE 2

| Band Frequency (domestic) | VHF low-band 90 MHz to 108 MHz | VHF high-band 170 MHz to 222 MHz | UHF 470 MHz to 770 MHz |
| --- | --- | --- | --- |
| SW1, SW2 | OFF | ON | Both ON or both OFF |

In the preferred embodiment 5, with both of the first switch 164 (SW1) and the second switch 167 (SW2) turned OFF, it is configured so as to be ready for receiving UHF.

First, the operation in receiving VHF low-band is described with reference to FIG. 10. When receiving VHF low-band, both the first switch 164 and the second switch 167 are turned OFF. Then, as shown in FIG. 10, it is configured in that the inductor 162a and inductor 162b are series-inserted between the input terminal 122 and the ground, and that the inductor 165a and inductor 165b are series-inserted between the connecting point 180 of the first capacitor 160 and the second capacitor 161 and the ground. And, since the respective inductors are connected in series, the combined resistance of these becomes increased and it is possible to obtain a match with respect to the low frequency of VHF low-band.

Next, the operation in receiving VHF high-band is described with reference to FIG. 11. When receiving VHF high-band, both the first switch 164 and the second switch 167 are turned ON. Then, both the inductor 162b side of inductor 162a and the inductor 165b side of inductor 165a are directly connected to the ground. That is, as shown in FIG. 11, it is configured in that only the inductor 162a is inserted between the input terminal 122 and the ground, and only the inductor 165a is inserted between the connecting point 180 and the ground. Accordingly, in receiving VHF high-band, the inductance is lessened and it is possible to obtain a match with respect to the frequency of VHF high-band.

Figure 13:
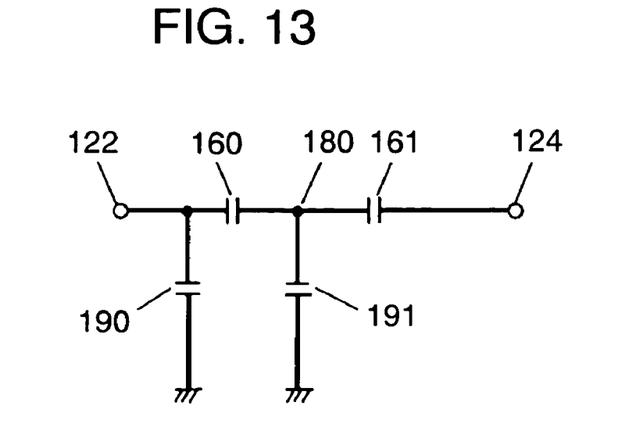
FIG. 13 is an equivalent circuit diagram in UHF receiving mode with switch turned ON of the same.

And finally, the operation in receiving UHF band signal is described with reference to the drawings. FIG. 12 is an equivalent circuit diagram in receiving UHF band signal when the switches 164, 167 are OFF. FIG. 13 is an equivalent circuit diagram in receiving UHF band signal when the switches 164, 167 are ON. As shown in FIG. 9A, B, all the inductors display capacitance characteristics with respect to UHF band signal. Accordingly, when receiving UHF band signal, the circuit is configured in that each capacitance component is inserted between the input terminal 122 and the ground and between the connecting point 180 and the ground as shown in FIG. 12 or FIG. 13. Thus, in receiving UHF band signal, the matching circuit 123 can be handled as a device formed of only capacitance components.

In the preferred embodiment 5, since UHF band signal is received when the switches 164, 167 are OFF, the matching circuit 123 becomes an equivalent circuit shown in FIG. 12. In this case, the circuit is configured in that the capacitance component 181 by inductor 162a and the capacitance component 182 by inductor 162b are series-connected between the input terminal 122 and the ground, and that the capacitance component 183 by inductor 165a and the capacitance component 184 by inductor 165b are series-inserted between the connecting point 180 and the ground. In this case, it is preferable to provide the self-resonance frequencies 176, 177 of all inductors 162a, 162b, 165a, 165b between the high-end 173a of VHF low and the low-end 175a of UHF band.

Also, it is preferable to receive UHF band signal when the switches 164, 167 are ON, and in that case, as shown in FIG. 13, the capacitance component 190 by inductor 162a is inserted between the input terminal 122 and the ground, and the capacitance component 191 by inductor 165a is inserted between the connecting point 180 and the ground.

In this case, it is preferable to provide the self-resonance frequency 176 of inductor 162a and inductor 165a between the high-end 174a of VHF high and the low-end 175a of UHF band. That is, in any case, it is very important that the inductor's self-resonance frequency is located outside the frequency band received.

Generally, as a frequency becomes higher, the high-frequency signal becomes easier to pass through the capacitance element. Particularly, in the case of a high frequency signal like UHF band, it is easier to pass through the capacitance element. Therefore, it is desirable to make the value of capacitance component of each inductor in UHF band as small as possible.

Accordingly, in the preferred embodiment 5, UHF band signal is received when the switches 164, 167 are OFF. That is, since the capacitance 181 and capacitance 182, and the capacitance 183 and capacitance 184 are respectively connected in series, the equivalent capacitance becomes lessened and it is possible to reduce the loss with respect to UHF band signal. Further, in this configuration, the inductor's resonance frequency is preferable to be between the high-end 173a of VHF low and the low-end 175a of UHF band. As a result, the allowable range is great and it is possible to increase the range of selecting the inductors for matching.

In the preferred embodiment 5, since the frequency difference between the high-end 174a of VHF high and the low-end 175a of UHF band is little, UHF band signal is received when the switches 164, 167 are OFF, but in case there is difference between the high-end 174a of VHF high and the low-end 175a of UHF band, it is preferable to receive UHF band signal when the switches 164, 167 are ON with respect to countries or districts where no broadcast service is available for example in the vicinity of the high-end 174a of VHF high and the low-end 175a of UHF band.

Figure 14:
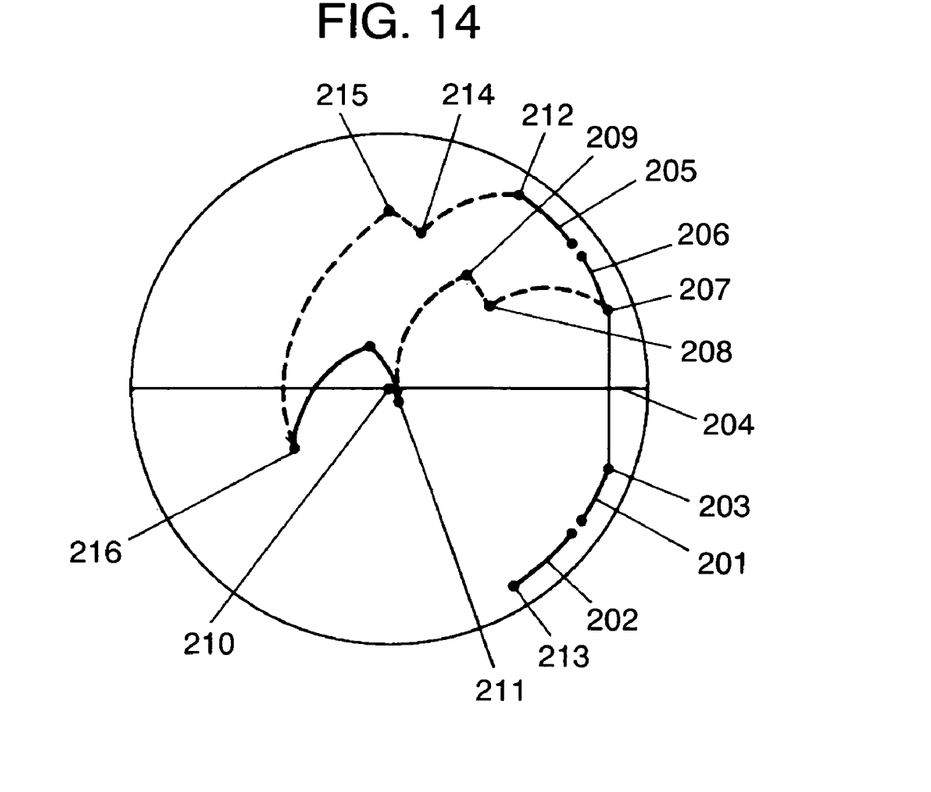
FIG. 14 is a Smith chart of an antenna and matching circuit in VHF receiving mode of the same.
Figure 15:
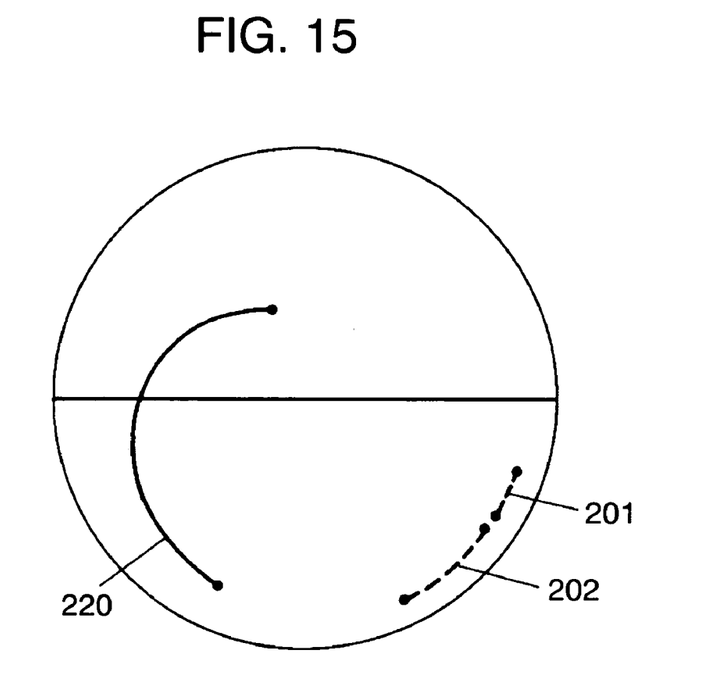
FIG. 15 is a Smith chart of an antenna and matching circuit in UHF receiving mode of the same.

Next, the matching operation of the matching circuit 123 having such configuration is described with reference to the drawings. FIG. 14 is a Smith chart of an antenna and matching circuit 123 in receiving VHF band signal. FIG. 15 is a Smith chart of an antenna and matching circuit 123 in receiving UHF band signal. In FIG. 14, 15, the upper half of the circle stands for inductance characteristics, and the lower half stands for capacitance characteristics. Also, the central point is the impedance value of equipment connected to the output of matching circuit 123. The impedance of tuner 125 connected to the output of matching circuit 123 is generally 75 ohm, and therefore, the central point of FIG. 14 is 75 ohm.

The antenna 121 is a bar-like antenna of 60 mm in length, and the length is very short as compared with $\lambda/4$ of the received signal, and accordingly, the impedance 201 of antenna 121 as against VHF low-band and the impedance 202 of antenna 121 as against VHF high-band become greatly lessened. For example, even at the highest channel frequency of VHF high-band, the wavelength $\lambda$ is 1300 mm, and therefore, the length of the antenna becomes shorter than $\lambda/4$, and the impedance 202 is lessened. Furthermore, at the lowest channel frequency of VHF low-band, since the wavelength is 3330 mm, the impedance is further lessened, and as shown in FIG. 14, the impedance 203 at the lowest frequency of VHF band becomes greatly lessened.

On the other hand, the input impedance of tuner 125 is generally 75 ohm, and when the antenna 121 is directly connected to the tuner 125, they do not match in impedance, causing the signal to be attenuated. Therefore, in the present invention, capacitors 160, 161 and inductors 162a, 162b, 165a, 165b are used as impedance elements for matching, and thereby, the matching purpose is achieved between the antenna 121 and the tuner 125 which do not match in impedance with each other.

For achieving the purpose, the impedance value at the input side of matching circuit 123 is nearly matched with the impedance of antenna 121. In this case, it is necessary to match the impedance value at the input side of matching circuit 123 as the complex number of impedance (value nearly symmetrical about axis 204 with respect to the impedance 201, 202 of antenna 121) of the antenna 121. First, as shown in FIG. 14, the value of inductor 162a is decided so that the impedance 205 of matching circuit 123 in VHF high-band matches with the impedance 202 of antenna 121. Next, the value of inductor 162b is decided so that the impedance 206 of matching circuit 123 in VHF low-band matches with the impedance 201 of antenna 121. Subsequently, the values of the first capacitor 160, second capacitor 161, and inductors 165a, 165b are properly selected so that the output impedance of matching circuit 123 comes closer to about 75 ohm (central point of FIG. 14) with respect to the frequencies of VHF low-band and VHF high-band.

However, since the antenna 121 itself has minute resistance value, the resistance (corresponding to R61a in the preferred embodiment 1) causes the generation of impedance at the antenna 121. Accordingly, when obtaining a match between the matching circuit 123 and the antenna 121, it is desirable to make the impedance value due to the resistance component of the matching circuit 123 nearly equivalent to the impedance due to the resistance component of the antenna. Therefore, the resistance value due to the minute resistance component of the inductor itself comprising the inductor 162a and inductor 162b is nearly equalized to the minute resistance value of the antenna 121 itself. In this case, it is preferable to decide the resistance value of the matching circuit 123 by properly selecting the types of elements used for inductor 162a and inductor 162b, the quantity or their circuits. In the case of an antenna with very small resistance value, it is preferable to configure chip resistance as in the embodiment described above.

By using the Smith chart shown in FIG. 14, the low-end frequency of VHF low and the high-end frequency of VHF high will be described as an example in the following with respect to the impedance variation of matching circuit 123 due to each element of the matching circuit 123.

Regarding the low end of VHF low, the impedance of the matching circuit 123 first becomes impedance value 207 due to the combined inductance of inductance 162a and inductance 162b;

subsequently changes to impedance 208 due to capacitor 160;

then changes to impedance 209 due to the combined inductance of inductance 165a and inductance 165b; and finally changes to impedance 211 close to center 210, 75 ohm, due to capacitor 161.

When receiving VHF high band, only inductor 162a is inserted between the input terminal 122 and the ground, and therefore, the inductance value is smaller as compared to the value in receiving VHF low band.

Accordingly, when receiving the high end of VHF high, the impedance at the input side of matching circuit 123 becomes impedance value 212, which nearly matches with the impedance 213 at the high end of VHF high of the antenna 121. Subsequently, the impedance changes to impedance 214 due to capacitor 160 and to impedance 215 due to inductor 165a, and finally changes to impedance 216 close to center 210, 75 ohm, due to capacitor 161.

Finally, the operation in receiving UHF band signal is described with reference to FIG. 15. Thus, since the length of antenna 121 becomes nearly λ/4 in the vicinity of the highest frequency of UHF band, the impedance 220 of antenna 121 in receiving UHF band signal displays inductance characteristic. And since each inductance of matching circuit 123 in receiving UHF displays capacitance characteristics, it becomes easier to make the impedance of matching circuit 123 closer to the complex number zone of impedance of the antenna 121.

In the vicinity of the low end of UHF band, since the impedance of both antenna 121 and matching circuit 123 displays capacitance characteristics, they do not match with each other. However, the impedance due to capacitors is inversely proportional to frequency, and therefore, the matching circuit 123 comprising only capacitance component with respect to UHF band signal becomes smaller in impedance and less in signal loss.

In the preferred embodiment 5, the inductance 162a is 82 nH, the inductance 162b is 440 nH, the inductance 165a is 120 nH, and the inductance 165b is 330 nH, while capacitor 160 is 2pF, and capacitor 161 is 6 pF. With these settings, it is possible to obtain a match with respect to both of VHF low-band and VHF high-band, and the matching circuit is less in loss of UHF band signal.

In the above configuration, the impedance of matching circuit 123 as viewed from the antenna 121 in receiving VHF band signal can be matched with the impedance of antenna 121 with respect to each band. Also, the impedance of matching circuit 123 as viewed from the tuner 125 can be matched with the impedance of the tuner 125. That is, the matching circuit 123 can obtain a match with respect to each of the VHF low-band and VHF high-band by selecting the circuit configuration in accordance with VHF low-band and VHF high-band. Also, since the matching circuit 123 displays capacitance characteristics with respect to UHF band signal, it is possible to reduce the loss. That is, the matching circuit 123, using very simple circuit configuration, is able to transmit the signal of each band to the tuner 125 without excessive loss, and it is possible to realize small-sized and inexpensive matching circuit 123.

Also, when receiving VHF low-band signal, the matching circuit 123 is unable to obtain a match with respect to VHF high-band signal, and therefore, VHF high-band signal becomes hard to pass in receiving VHF low-band signal. Contrarily, when receiving VHF high-band signal, since it is unable to obtain a match with respect to VHF low-band signal, VHF low-band signal becomes hard to pass in VHF high-band signal receiving mode. Accordingly, since the matching circuit 123 is connected before the low-pass filter 128 such as the tuner 125, it is possible to reduce the attenuation characteristic of input filters such as single-tuned filters 141, 146, 151 and double-tuned filters 143, 148, 153, and to simplify these input filters. In this way, it is possible to realize the price reduction of tuner 125 and to take the signal input to antenna 121 into the tuner 125 without loss.

Since switches 164, 167 are not provided on the signal line, there will be no generation of signal loss or the like due to the switches 164, 167.

(Preferred Embodiment 6)

Figure 16:
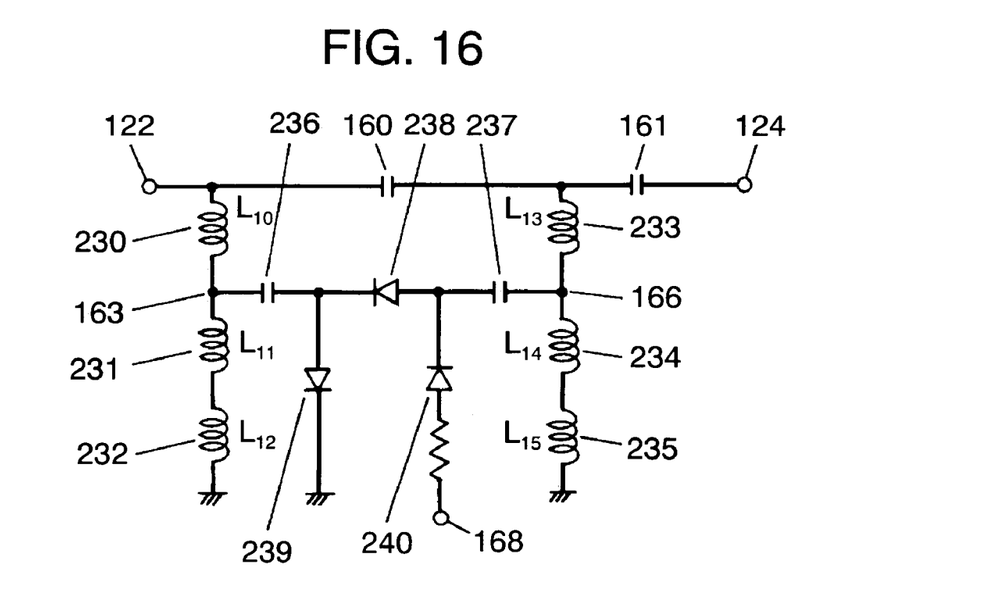
FIG. 16 is a circuit diagram of a matching circuit in the preferred embodiment 6 of the present invention.
Figure 17:
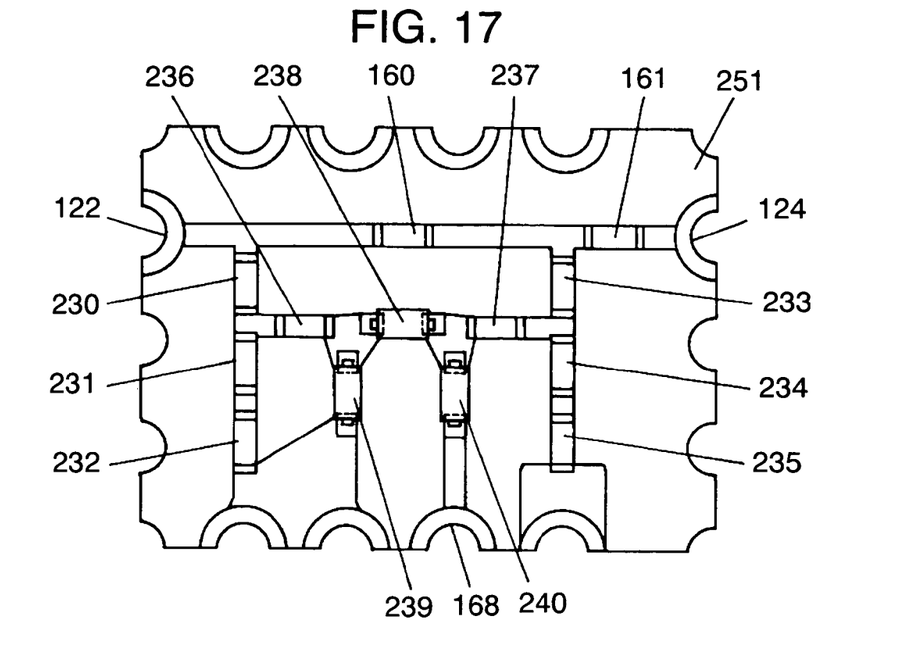
FIG. 17 is a layout of component parts of the same.

The preferred embodiment 6 will be described in the following with reference to the drawings. FIG. 16 is a circuit diagram of a matching circuit in the preferred embodiment 6. FIG. 17 is a layout of the component parts. In FIG. 16 and FIG. 17, those same as in FIG. 8 are given same reference numerals, and the description is simplified. In FIG. 16, the first inductor 162 comprises inductor 230, inductor 231, and inductor 232 which are connected in series. One end of the first inductor 162 is connected to the input terminal 122, and the other end is grounded. The second inductor 165 comprises inductor 233, inductor 234, and inductor 235 which are connected in series. One end of the second inductor 165 is connected to the connecting point of capacitors 160 and 161, and the other end is grounded.

One end of capacitor 236 is connected to the connecting point of inductor 230 and inductor 231, and the other end is connected to the cathode of diode 238. One end of capacitor 237 is connected to the connecting point 166 of inductors 233 and 234, and the other end is connected to the anode of diode 238. The anode of diode 239 is connected to the cathode of diode 238, and the cathode of diode 239 is grounded. The cathode of diode 240 is connected to the anode of diode 238, and the anode of diode 240 is connected to the control terminal 168 via resistance. The diodes 238, 239, 240 and the capacitors 236, 237 make up the switches 164, 167 of the preferred embodiment 5.

The capacitors 236, 237 are provided in order to prevent DC signal of control signal, from flowing to the input terminal 122 and output terminal 124. Further, the diode 238 is provided in order to prevent high-frequency signal from flowing between the connecting point 163 and the connecting point 166 when the diode 239 is OFF. Finally, the diode 240 is provided in order to prevent high-frequency signal from flowing out of the control terminal 168. And when receiving VHF high band, apply 5V to the control terminal 168, then the diodes 238, 239 and 240 are turned ON, and when receiving VHF low band, set the voltage of the control terminal to 0V, then the diodes 238, 239 and 240 are turned OFF.

These circuits, as shown in FIG. 17, comprise chip parts, and these chip parts are mounted on double-sided printed circuit board 251 by reflow soldering, which are then connected and secured by soldering. And the input terminal 122 and output terminal 124 of matching circuit 123a, the control terminal 168, and the ground terminal are formed by through-hole terminals. The matching circuit 123a is provided with a cover (not shown), and the cover leg portion and the ground terminal are soldered for the purpose of shielding.

The capacitor 160 is 2 pF, and the capacitor 161 is 6 pF. Also, the constant of each inductor is as shown in Table 3, and thus, it is possible to obtain the match for both of VHF low band and VHF high band, and to realize the matching circuit 123a which is less in attenuation of UHF band signal.

TABLE 3

Unit: mH

| No. | Band | Frequency 1 MHz | VHF low-band 100 MHz | VHF high-band 200 MHz | UHF 500 MHz | |
|---|---|---|---|---|---|---|
| 230 | L10 | 82 | 83.5 | 94.4 | 2380 | L1 |
| 231 | L11 | 220 | 248.2 | 389.5 | −126 | L2 |
| 232 | L12 | 220 | 248.2 | 389.5 | −126 | |
| 233 | L13 | 120 | 127.4 | 155.6 | −248 | L3 |
| 234 | L14 | 150 | 164.3 | 215.2 | −171 | L4 |
| 235 | L15 | 180 | 189.2 | 260.8 | −150 | |

Mentioned in Table 3 are the measured value of each inductor with respect to 100 MHz as a representative of VHF low-band frequency, 200 MHz as a representative of VHF high-band frequency, and 500 MHz as a representative of UHF. Here, the inductor 230 (L10) should originally display capacitance characteristics in UHF band. However, the value of inductance 230 is 2380 nH, displaying inductance characteristics. This is because the inductance 230 individually displays inductance characteristic in UHF band as a result of selecting inductance most appropriate for both of VHF low band and VHF high band with respect to the inductance 230. That is, the self-resonance frequency of the inductor 230 is within the frequency of UHF band.

However, the inductor 230 is connected to substrate conductor 251 via solder in minute inductance. Thus, the resonance frequency of a combined inductor formed by the inductor 230 and substrate conductor 251 is lowered, displaying capacitance characteristic with respect to the frequency of UHF band. And, since minute inductance by the substrate conductor 251 is very slight, the influence to the frequency of VHF band is very slight.

That is, optimum constant that satisfies all the conditions is not always available. In that case, it is preferable to select such constant that inductance characteristic is displayed at the frequency of VHF band and that best match is obtained with respect to the frequencies of VHF high-band and VHF low-band. And when the inductor 230 displays inductance characteristic with respect to the frequency of UHF band, it is preferable to properly determine the material for the substrate conductor 251 so as to display capacitance characteristic.

In this way, even when the constant of inductor actually used is not a value that does not display capacitance characteristic with respect to the frequency of UHF band, it is possible to easily display capacitance characteristic with respect to the frequency of UHF band. Also, this means that the range of selecting the constant of inductor used can be expanded.

Since each inductor is reflow-soldered to the pattern, each inductor can be accurately soldered at nearly same position due to the self-alignment effect of reflow soldering. Accordingly, the minute inductance value formed by the substrate conductor 251 becomes nearly constant, and it is possible to stabilize the self-oscillation frequency of the first inductor 162, thereby stabilizing the manufacturing quality of matching circuit 123a.

According to the present invention, the antenna is formed from rigid metal and its length is shorter than the quarter wavelength of broadcast wave, while the matching circuit is formed of reactance element having fine DC resistance. And, the impedance value due to the resistance component of the antenna as viewed from the matching circuit is nearly equalized to the impedance value of the matching circuit as viewed from the antenna. Since the antenna is formed from rigid metal, it may obtain a stable state of signal reception without floating during the reception.

Also, because of having a matching circuit which obtains a match with signal input via minute resistance component, the antenna with a length shorter than the quarter wavelength of FM broadcast wave is able to receive signals with sufficient sensitivity.

What is claimed is:

1. A portable receiver, comprising:
   an antenna for receiving broadcast waves;
   a matching circuit to which signal received by the antenna is supplied via resistance component;
   a receiver unit for demodulating received broadcast waves, to which output of the matching circuit is connected; and
   an output means which outputs signal demodulated by the receiver unit,
   wherein length of the antenna is shorter than a quarter wavelength of the broadcast wave; and
   wherein impedance of the antenna as viewed through the resistance component from the matching circuit and input impedance value of the matching circuit are substantially equivalent.

2. The portable receiver of claim 1,
   wherein the antenna is formed from rigid metal, and the matching circuit comprises a reactance element.

3. The portable receiver of claim 2,
   wherein the reactance element has a minute resistance value that is substantially equivalent to the resistance component.

4. The portable receiver of claim 2,
   wherein the broadcast wave is at least FM broadcast wave,
   the receiver unit demodulates audio signal from the FM broadcast wave received; and
   wherein the output means outputs the demodulated audio.

5. The portable receiver of claim 2,
   wherein the resistance component comprises a resistance element; and
   wherein the resistance element is connected between the antenna and the matching circuit.

6. The portable receiver of claim 2,
   wherein the antenna comprises a movable section which is movable toward the matching circuit; and
   wherein the resistance component formed by contact resistance of the movable section.

7. The portable receiver of claim 2, further comprising:
   a slide member which slides with the antenna,
   wherein the antenna slides with the slide member and can be put into or taken out of the portable receiver; and
   wherein the resistance component is formed at the slide member.

8. The portable receiver of claim 2,
wherein an active element of a high-frequency amplifier comprising the receiver unit is arranged in the vicinity of output of the matching circuit.

9. The portable receiver of claim 4, comprising:
a telephone unit for communication in a frequency band higher than the FM broadcast wave; and
a speaker for outputting telephone voice received and the demodulated audio,
wherein the antenna further transmits and receives electric waves of the telephone unit.

10. The portable receiver of claim 2,
wherein the broadcast wave is TV broadcast wave;
wherein the receiver unit demodulates video and audio signals from the TV broadcast waves received; and
wherein the output serves to output the demodulated video and audio.

11. The portable receiver of claim 10, further comprising:
a telephone unit for communication in a frequency band higher than the TV broadcast wave,
wherein the antenna further transmits and receives electric waves of the telephone unit;
wherein the output means comprises a display and a speaker;
wherein the display serves to display the demodulated video and an image received by the telephone unit; and
wherein the speaker serves to output the demodulated audio and telephone voice received by the receiver unit.

12. The portable receiver of claim 10,
wherein the TV broadcast wave band includes a first broadcast band, a second broadcast band that is higher in frequency band than the first broadcast band, and a third broadcast band that is higher in frequency band than the second broadcast band;
wherein the matching circuit comprises:
a capacitor connected between the input terminal and output terminal;
a first inductor with one end grounded and the other end connected to one end of the capacitor;
a second inductor with one end grounded and the other end connected to the other end of the capacitor; and
a switching means for switching the first inductor value according to the first broadcast band and the second broadcast band; and
wherein the first inductor displays inductance characteristic at the first broadcast band and the second broadcast band, and displays capacitance characteristic at the third broadcast band.

13. The portable receiver of claim 12,
wherein the switching means further switches the second inductor value according to the first broadcast band and the second broadcast band; and
wherein the second inductor displays inductance characteristic at the first broadcast band and the second broadcast band, and displays capacitance characteristic at the third broadcast band.

14. The portable receiver of claim 12,
wherein the first inductor comprises a third inductor and a fourth inductor which are connected in series; and
wherein the switching means serves to short-circuit both terminals of the fourth inductor in receiving the second broadcast band.

15. The portable receiver of claim 14,
wherein the second inductor comprises a fifth inductor and a sixth inductor which are connected in series; and
wherein the switching means serves to short-circuit both terminals of the sixth inductor in receiving the second broadcast band.

16. The portable receiver of claim 14,
wherein the third inductor and the fourth inductor are connected by circuit patterns and are reflow-soldered.

17. The portable receiver of claim 14,
wherein the self-resonance point of the third inductor is set between the second broadcast band and the third broadcast band.

18. The portable receiver of claim 14,
wherein the combined self-resonance point of the third inductor and the fourth inductor is set between the first broadcast band and the third broadcast band.

19. The portable receiver of claim 13,
wherein resistance of the antenna connected to an input terminal of the matching circuit and resistance of the matching circuit as viewed from the input terminal of the matching circuit are substantially equivalent to each other.

* * * * *